(12) United States Patent
Kweon

(10) Patent No.: US 7,116,889 B2
(45) Date of Patent: Oct. 3, 2006

(54) REAL-TIME COMPENSATION APPARATUS AND METHOD FOR DIGITAL TELEVISION RECEIVER

(75) Inventor: Hyek Seong Kweon, Taegu-shi (KR)

(73) Assignee: LG Electronics Inc., Seoul (KR)

( * ) Notice: Subject to any disclaimer, the term of this patent is extended or adjusted under 35 U.S.C. 154(b) by 1147 days.

(21) Appl. No.: 09/905,943

(22) Filed: Jul. 17, 2001

(65) Prior Publication Data

US 2002/0008775 A1 Jan. 24, 2002

(30) Foreign Application Priority Data

Jul. 18, 2000 (KR) .............................. 2000-41006

(51) Int. Cl.
- *H04N 5/76* (2006.01)
- *H04N 5/445* (2006.01)
- *H04N 7/173* (2006.01)
- *H04N 7/16* (2006.01)
- *H04N 7/00* (2006.01)
- *G06F 3/00* (2006.01)
- *G06F 13/00* (2006.01)

(52) U.S. Cl. ............................ 386/46; 386/83; 725/58; 725/134; 725/142

(58) Field of Classification Search .................... 386/1, 386/83, 46, 113; 725/58, 134, 142
See application file for complete search history.

(56) References Cited

U.S. PATENT DOCUMENTS

| 5,293,357 A * | 3/1994 | Hallenbeck .................. 725/39 |
| 6,292,943 B1 * | 9/2001 | Shin et al. ..................... 725/58 |
| 6,922,846 B1 * | 7/2005 | Kessler et al. .............. 725/151 |

* cited by examiner

*Primary Examiner*—Thai Tran
*Assistant Examiner*—Gelek Topgyal
(74) *Attorney, Agent, or Firm*—Fleshner & Kim, LLP

(57) ABSTRACT

A real-time compensation apparatus and method for a digital TV that can update the present time without addition of a non-volatile memory or RTC. The apparatus includes a first control section for controlling a power supply of a system, updating a time by dividing a system clock, and outputting a reserved recording signal according to comparison result of the present time with a user's reserved recording time; and a second control section for transmitting the reserved recording information stored in a flash memory and the present time to the first control section if the power supply is off, and outputting a load control signal so that output of video and audio is performed according to the signal outputted from the first control section according to the user's reserved recording time. The apparatus and method can reduce the loss of the real-time function such as the user's reserved recording by updating the present time without addition of any separate device even if the power supply is resumed due to the power failure and so on, and thus improve the reliability of the product.

8 Claims, 9 Drawing Sheets

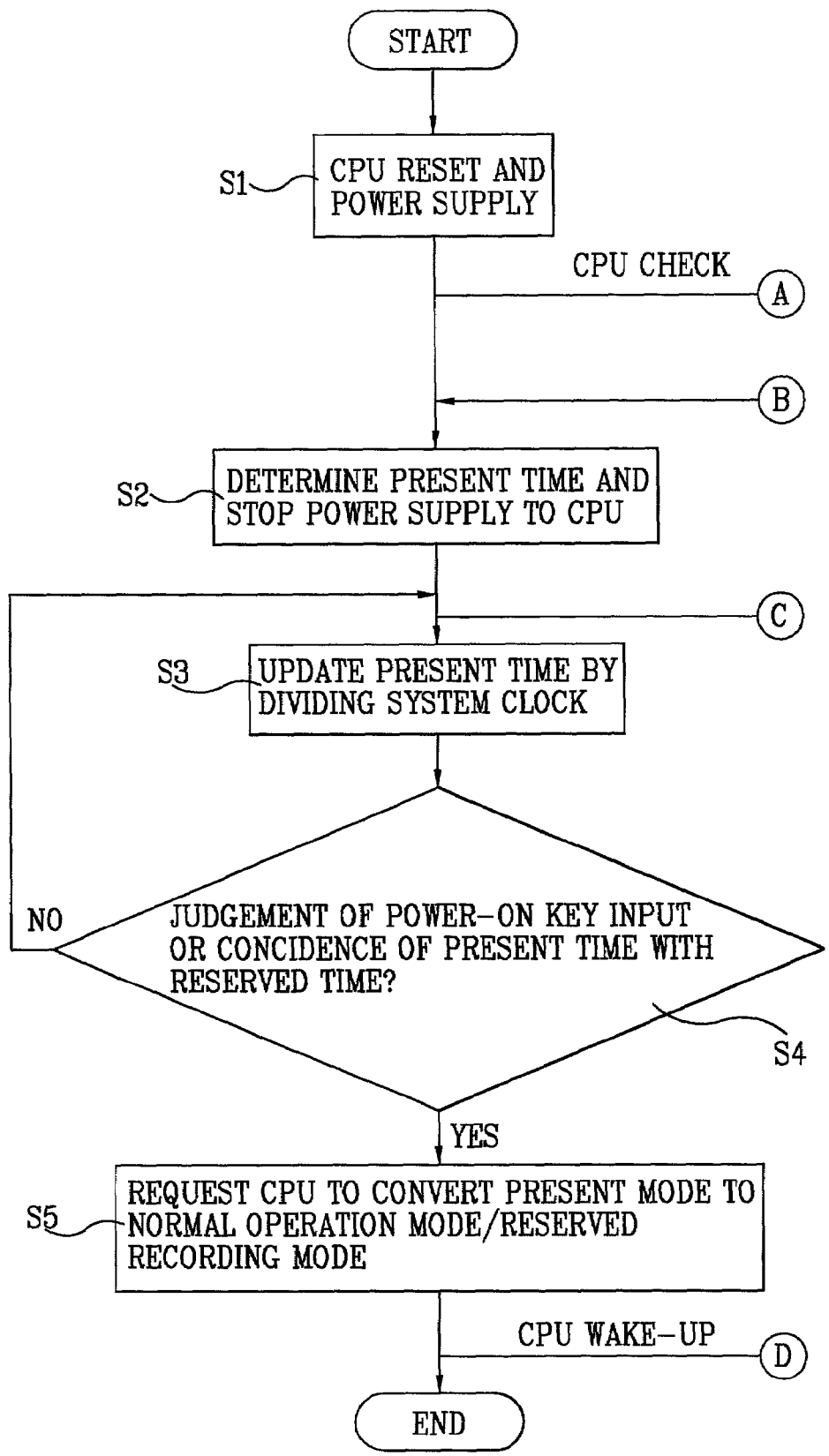

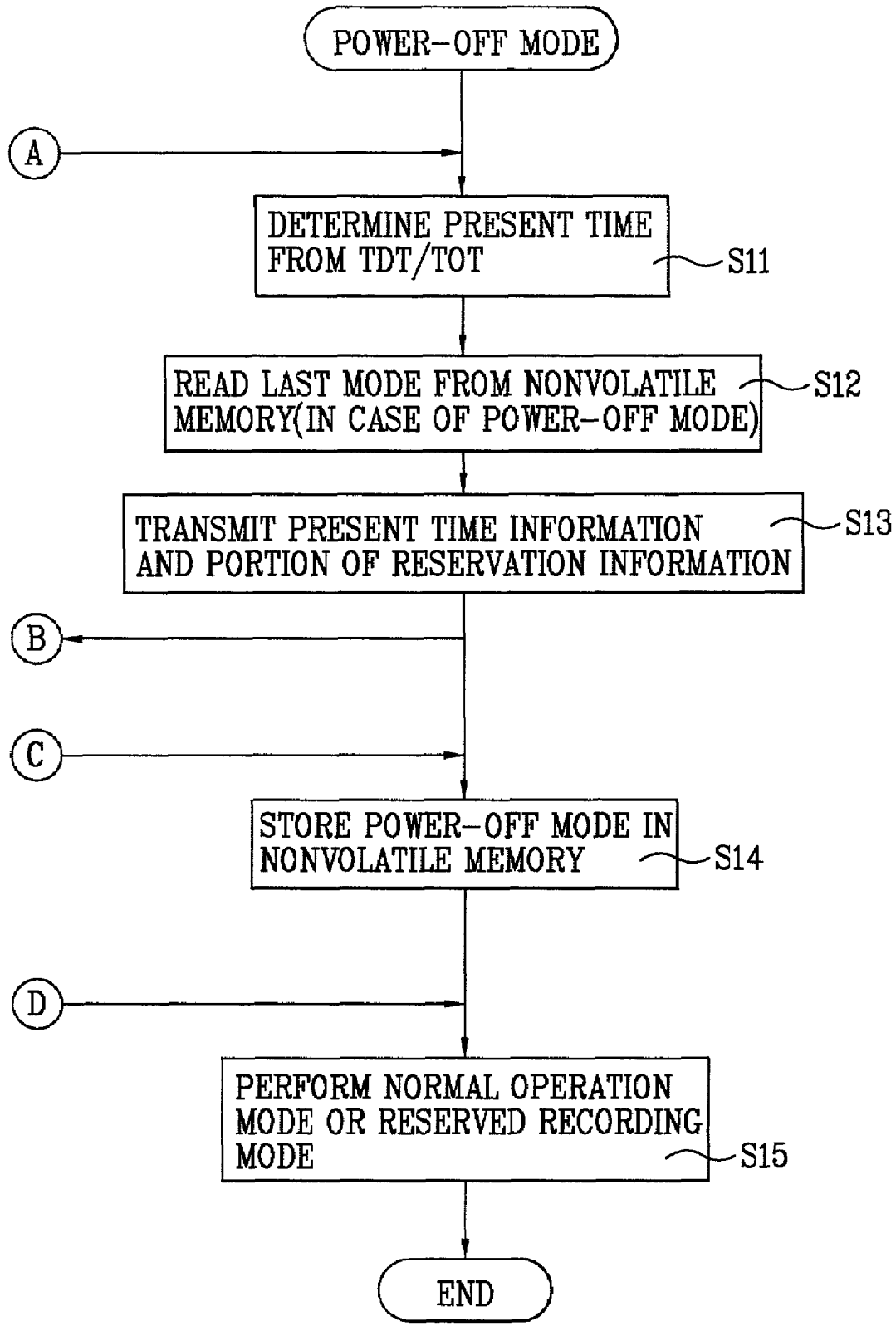

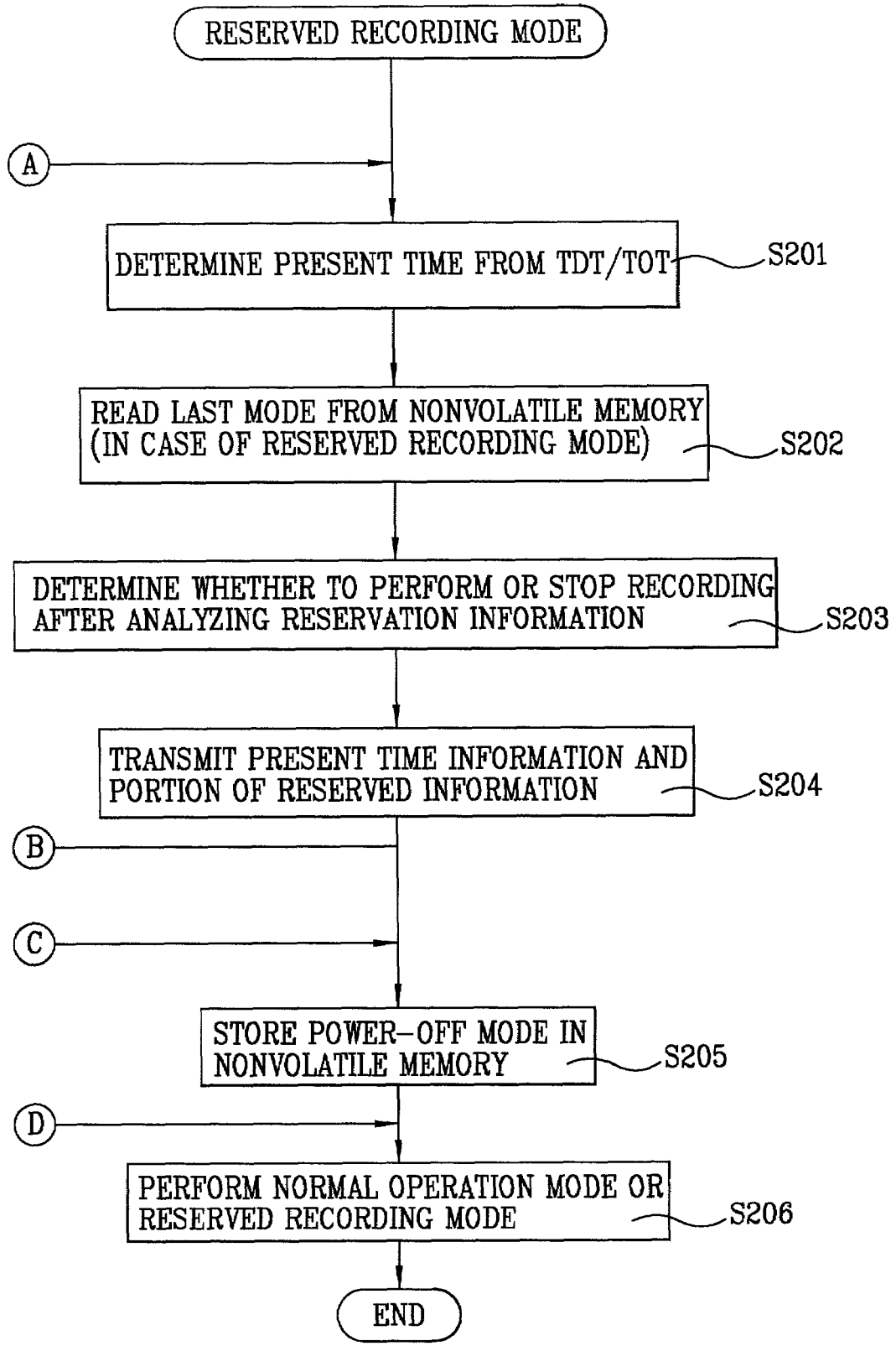

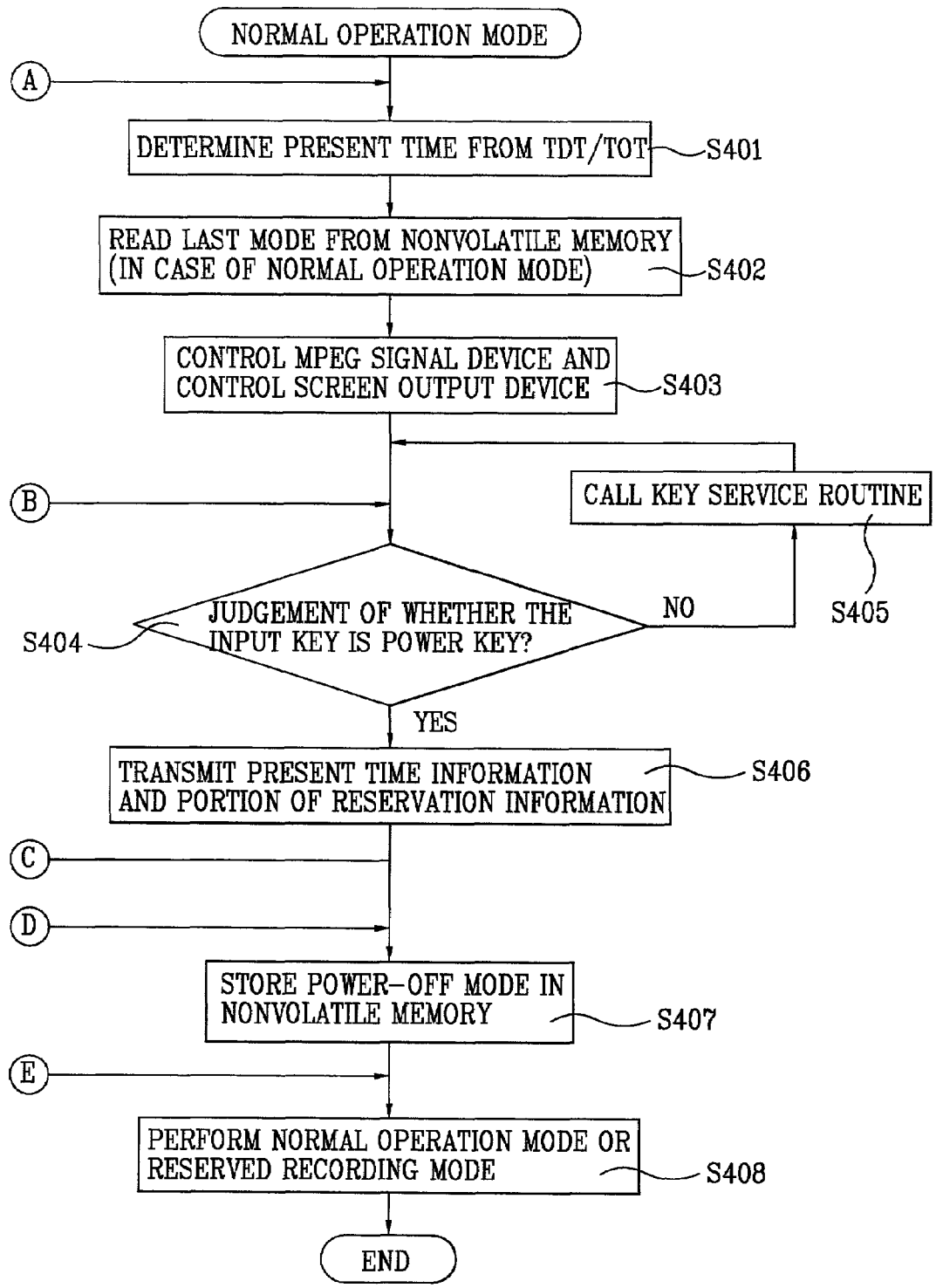

REAL-TIME COMPENSATION APPARATUS AND METHOD FOR DIGITAL TELEVISION RECEIVER

BACKGROUND OF THE INVENTION

1. Field of the Invention

The present invention relates generally to a television receiver, and more particularly, to a real-time compensation apparatus and method for a digital television receiver that determines a system time when the power supply is resumed, and controls the system according to the determined time.

2. Background of the Related Art

Generally, a television receiver (TV) that displays images by restoring broadcasting signals, which have been compressed into digital signals, through a decoder built in or outside the receiver is called a digital TV.

According to such a digital TV, since the whole process is digitally processed, any radio wave interference as in an analog TV does not occur, and a high picture quality and tone quality on the same level with a compact disc can be achieved. Also, since the bandwidth is effectively used in the digital TV, broadcasting channels more than those in the analog type TV can be secured in the same frequency band, and in theory, up to 100 TV broadcasting channels can be operated for each country.

Meanwhile, methods of effectively using the power supply in an electronic appliance such as the digital TV have been sought. Specifically, to solve the above-described problems, the conventional digital TV uses separate processors for input of keys, input through a remote control unit (RCU), and control of the power supply part. Also, the digital TV uses a real-time clock (RTC) for the present time and reservation information that uses a backup power supply, or uses a non-volatile memory such as $E^2PROM$.

The digital TV performs a reserved recording in a manner that if a predetermined time elapses in a state that the digital TV is turned on, a video cassette recorder (VCR) that is an external appliance performs the recording in association with only an MPEG signal part of the digital TV, and if a user's program reservation time coincides with the present time, it performs the reserved recording function.

Hereinafter, the construction of the conventional digital TV will be explained with reference to the accompanying drawings.

FIG. 1 is a block diagram illustrating the construction of the conventional digital TV, and FIG. 2 is a block diagram illustrating the construction of the recording part of the digital TV.

The conventional digital TV for compensating for the real-time and reservation information includes two parts, i.e., a control part 10 and a driving part 20. The control part 10 comprises a remote control unit (RCU) input section 11, key input section 12, ROM 13, RAM 14, real-time clock (RTC) 16 for the real-time compensation, and first control section 17 in charge of controlling the power supply and operation according to the RCU input or key input. The driving part 20 comprises a second control section 21 for controlling a digital audio/video (A/V) output and a load 22, flash memory 24 and DRAM 23 for storing control signals from the second control section 21 or control signals from the control part.

In the conventional digital TV as constructed above, the first control section 17 receives a signal through the remote control unit (RCU) input section 11 and a key signal through the keypad 12, and transmits the signals to the second control section (i.e., CPU) 12 through a communication protocol. Also, the first control section 17 applies a reset signal 40 to the second control section 21 when the power is on.

The second control section 21 controls the load 22 so that the video and audio output is performed according to a signal self-produced and processed by the user's input signal and an MPEG signal transferred through a tuner that is one of controlled load devices.

Then, the second control section 21 stores the determined present time in the flash memory 24 using the user's input signal, signal processed according to the MPEG signal, and time date table (TDT)/TOT.

In the digital TV, the information on the presently broadcast programs is provided to the user using an event information table (EIT), and the time information can be obtained using the time date table (TDT) broadcast in synchronization with the EIT.

When the power is off, the first control section 17 updates the present time by using the RTC 16 or dividing the system clock, and compares the reserved time stored in the flash memory 24 with the present time. If the present time coincides with the reserved time, the first control section 17 turns on the power of the second control section to perform the reserved recording.

In performing the reserved recording, as shown in FIG. 2, the second control section 500 sends the MPEG signal of the tuner that is one of the controlled load devices to an MPEG decoder 510, so that the MPEG decoder 510 divides the MPEG signal into video and audio signals. If the reserved time according to the reservation signal elapses, a signal selection section 520 selects the channel signal desired by the user among the separated channel signals, and sends the selected channel signal to a SCART 530. The SCART 530 sends to a VCR 540 the video and audio signals of the selected channel, and a control signal for commanding the recording.

However, if the power of the second control section 21 is off, the information on the present time cannot be continuously updated. Consequently, the second control section 21 should be separately provided with the real time clock (RTC) having a backup power or a non-volatile memory that can store the reservation information of the user.

As described above, according to the conventional digital TV, the present time can be updated using the RTC having the self-backup power, but in case that the present time is updated by dividing the system clock without using the RTC, or the power supply is resumed due to the power failure or other reasons, there is no way to update the present time.

SUMMARY OF THE INVENTION

Accordingly, the present invention is directed to a real-time compensation apparatus and method for a digital TV that substantially obviates one or more problems due to limitations and disadvantages of the related art.

An object of the present invention is to provide a real-time compensation apparatus and method for a digital TV that can update the present time without addition of a non-volatile memory or RTC to the existing digital TV.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a real-time compensation apparatus for a digital TV includes a first control section for controlling a power supply of a system, updating a time by dividing a system clock, and outputting a reserved recording signal according to a result of comparing the present time with a user's reserved recording time, and a second control section for transmitting the reserved recording information stored in a flash memory and the present time to the first control section if the power supply is off, and outputting a load control signal so that output of video and audio signals is performed according to the signal outputted from the first control section according to the user's reserved recording time.

In another aspect of the present invention, a method of controlling a real-time compensation apparatus for a digital TV having a flash memory, first control section and second control section, the method includes the steps of normally operating the second control section by supplying a power to the second control section according to control of the first control section if a main power supply is resumed, and updating time information and reservation information according to predetermined first to third modes if the second control section is normally operated.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 is a flowchart illustrating the updating of time and reservation information in a power-off mode according to the present invention;

DETAILED DESCRIPTION OF THE PREFERRED EMBODIMENTS

Reference will now be made in detail to the preferred embodiments of the present invention, examples of which are illustrated in the accompanying drawings.

Figure 1:
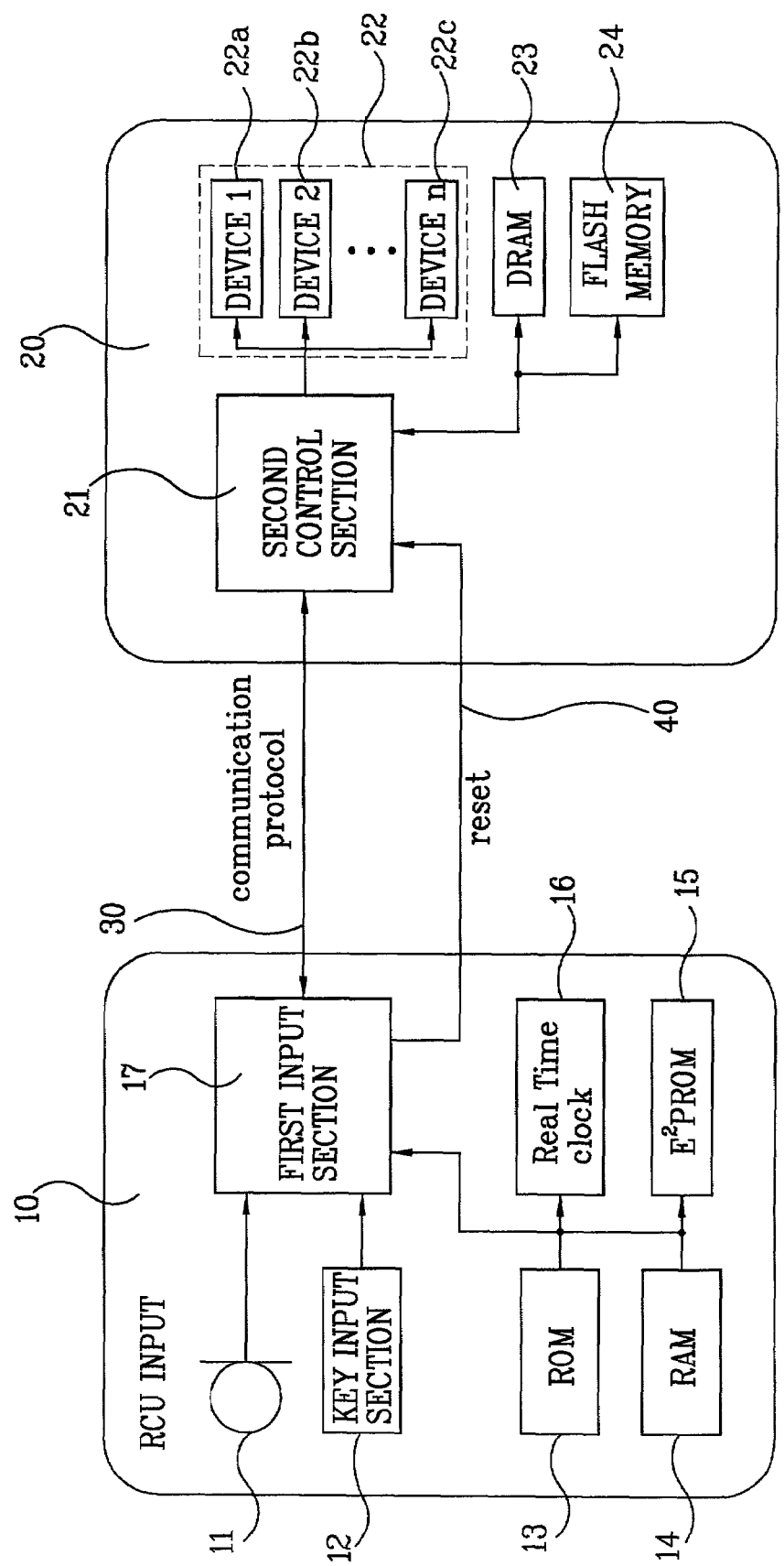
FIG. 1 is a block diagram illustrating the construction of the conventional digital TV.
Figure 2:
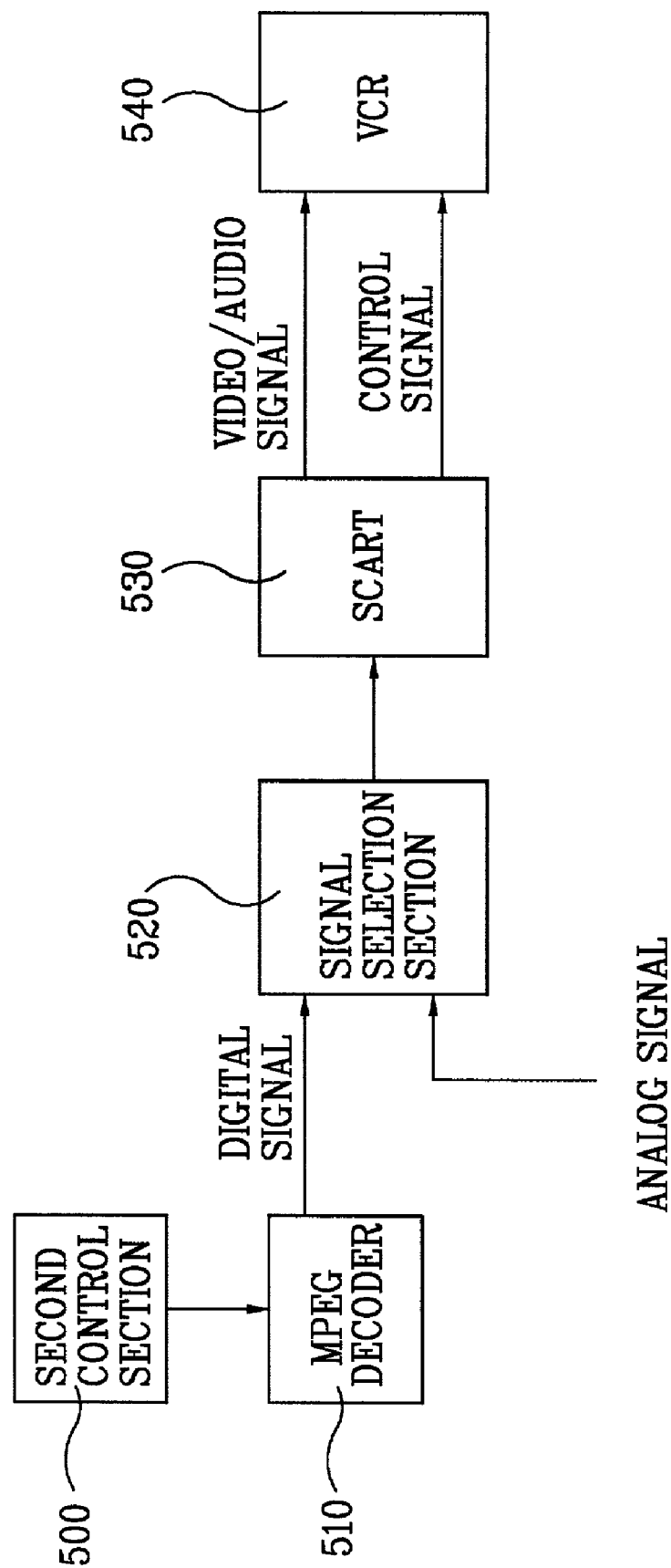
FIG. 2 is a block diagram illustrating the construction of a recording part of the conventional digital TV.
Figure 3:
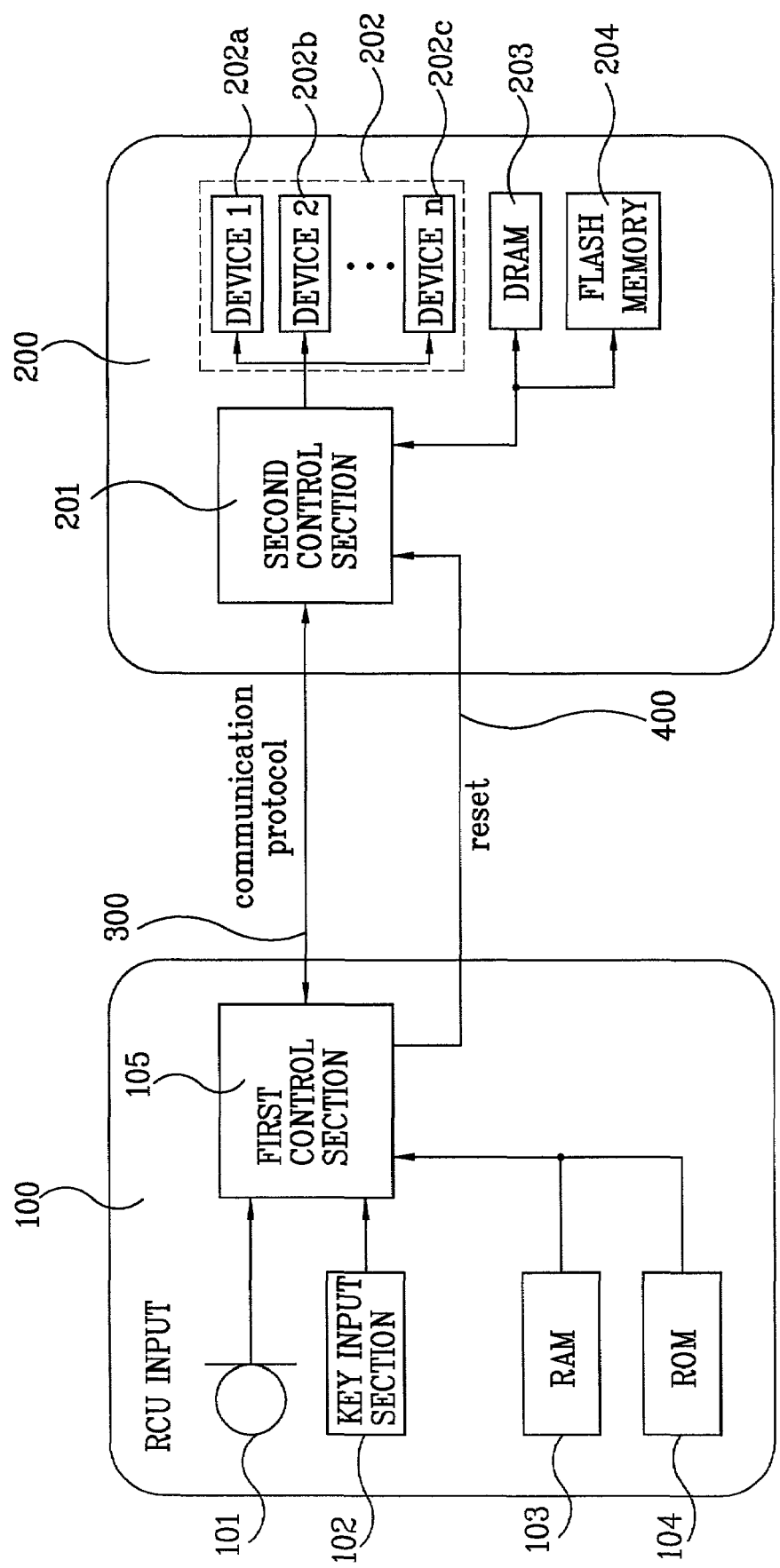
FIG. 3 is a block diagram illustrating the construction of a real-time compensation apparatus for a digital TV according to the present invention.
Figure 5A:
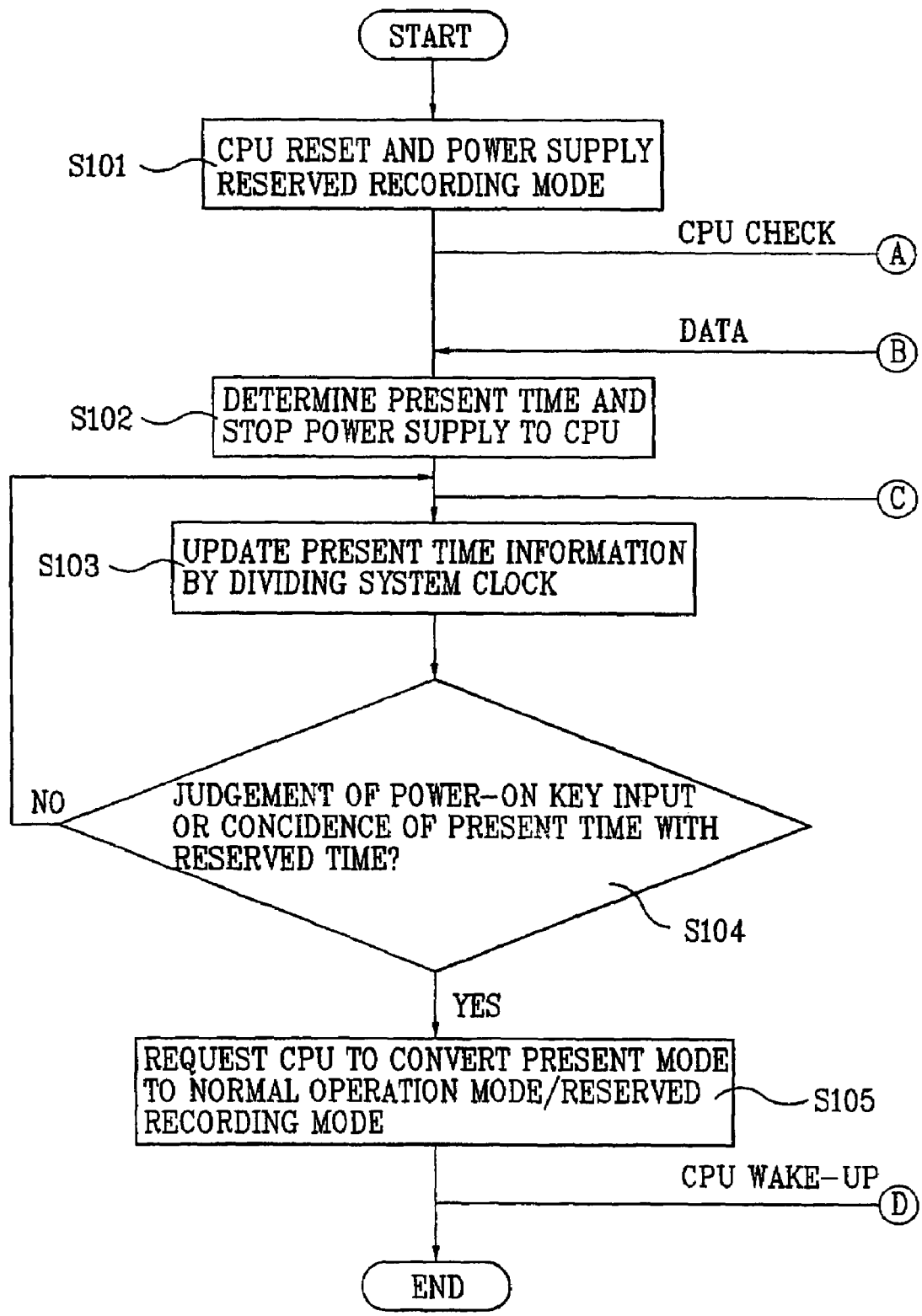
FIG. 5 is a flowchart illustrating the updating of time and reservation information in a reserved recording mode according to the present invention.
Figure 6A:
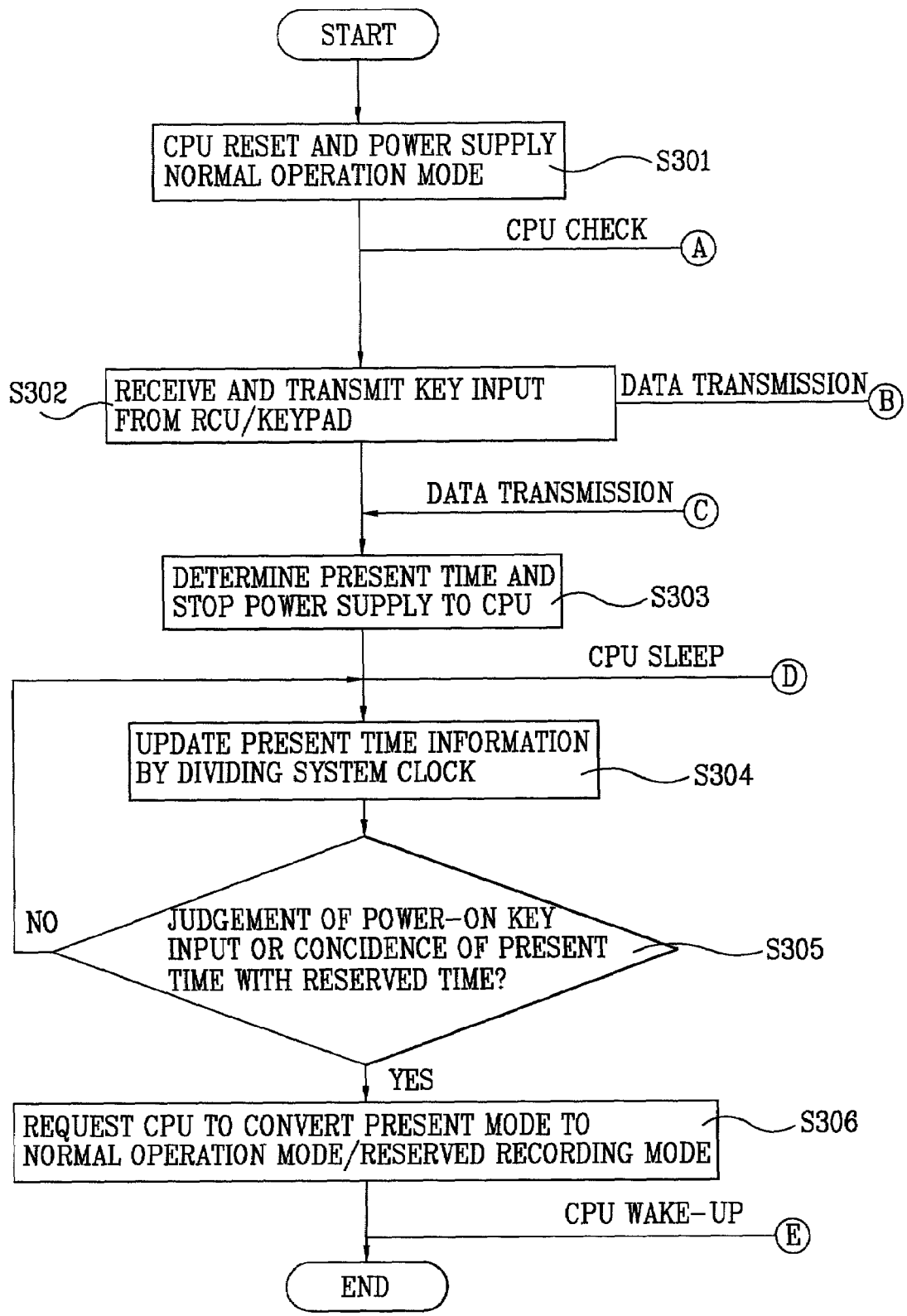
FIG. 6 is a flowchart illustrating the updating time and reservation information in a normal operation mode according to the present invention.

FIG. 3 is a block diagram illustrating the construction of a real-time compensation apparatus for a digital TV according to the present invention. FIG. 4 is a flowchart illustrating the updating of time and reservation information in a power-off mode according to the present invention, FIG. 5 is a flowchart illustrating the updating of time and reservation information in a reserved recording mode according to the present invention, and FIG. 6 is a flowchart illustrating the updating time and reservation information in a normal operation mode according to the present invention.

As shown in FIG. 3, the real-time compensation apparatus for a digital TV according to the present invention includes a key input section 102 for inputting a user's key signal, a remote control unit (RCU) input section 101 for receiving signals according to the user of the RCU, a flash memory 204 for storing the input signal, a second control section 201 for receiving and storing in the memory 204 the key input signal and the RCU signal, and controlling a load so that output of video and audio is performed according to the input signal, and a first control section 105 for sending the input signal to the second control section, and controlling the power supply to the second control section according to existence/nonexistence of the power supply.

FIG. 4 illustrates the method of controlling the real-time compensation apparatus for a digital TV as constructed above. The first control section 105 applies to the second control section 201 the power and the reset signal (step S1) if the power supply is resumed due to the power failure and so on. If the second control section 201 is operated by the power and the reset signal applied thereto, the second control section 201 designates the present time using the TDT/TOT (step S11).

If the present time of the second control section 201 is designated (step S11), the first control section 105 receives the operation state of the digital TV just before the power of the digital TV is turned off, the designated present time, and the reserved recording information that is the earliest one among the user's reserved recording time information, which are stored in the flash memory 204 (step S12), and performs the corresponding operation mode by analyzing the operation state just before the turn-off of the power and the reserved recording information.

The operation mode is classified into a power-off mode, reserved recording mode, and normal mode according to the operation state of the digital TV just before the power-off of the digital TV and the reserved recording information. The operation in each mode will be explained in detail with reference to the accompanying drawings.

If the power supply is resumed due to the power failure or other reasons in a standby state of the digital TV, the power-off mode is performed. If the time when the power of the digital TV is resumed is situated on the reserved recording time of the VCR connected to the digital TV, the reserved recording mode is performed. If the power supply is resumed in a state that the power of the digital TV is on, the normal mode is performed.

As shown in FIG. 4, in the power-off mode, the power is supplied to the second control section 201 of the digital TV. If the present time and the operation mode are determined (steps S1, S11~S12), the first control section 201 receives from the second control section the reserved recording information that is the earliest one among the user's reserved recording time information stored in the flash memory 204 and the present time, and then turns off the power of the second control section 105 (step S2).

If the power of the second control section 201 is off, the second control section 201 stores in the flash memory 204 the present operation state of the second control section 201 and the power-off state of the second control section 201, and terminates its operation (step S14).

Then, if the operation of the second control section 201 is terminated by the power-off, the first control section 105 updates the present time by dividing the system clock based on the inputted present time (step S3). At this time, if the present time of the first control section 105 is updated, it is judged whether the power key is inputted and whether the present time coincides with the reserved recording time (step S4).

As a result of judgement at step S4, if the present time and the reserved time information do not coincide with each other or the power key is not inputted, the updating of the present time is continuously performed (steps S3 and S4).

As a result of judgement at step S4, if the present time and the reserved time information coincide with each other, a signal for the reserved recording mode is outputted, while if the power key is inputted, a signal for the normal operation mode is outputted (step S5), so that the operation of the respective mode is performed (step S15).

As shown in FIG. 5, in the reserved recording mode, the second control section compares the present time with the reserved recording time, and if the present time is situated on the reserved recording time, the second control section judges whether to perform the recording according to the information previously selected by the user (step S203).

Then, if the power is applied to the second control section 201 of the digital TV, and the present time and the operation mode is determined (step S101, S201~S202), the second control section compares the present time with the reserved recording time, and if the present time is situated on the reserved recording time, the second control section judges whether to perform the recording according to the information previously selected by the user (step S203).

Meanwhile, if the recording is determined as a result of judgement (step S203), the first control section 201 receives from the second control section the earliest reserved recording information among the reserved recording time information stored in the flash memory 204 and the present time (step S204), and turns off the power of the second control section 105 (step S102)

Then, if the power of the second control section 201 is off, the second control section 201 stores in the flash memory 204 the current operation state of the second control section 201 and the power-off state of the second control section 201, and terminates its operation (step S205).

Then, if the operation of the second control section 201 is terminated due to the power-off, the first control section 105 updates the present time by dividing the system clock based on the inputted present time (step S103). At this time, if the present time of the first control section 105 is updated, the first control section 105 judges whether the power key is inputted and whether the present time coincides with the reserved recording time (step S104).

As a result of judgement at step S104, if the present time and the reserved time do not coincide with each other or the power key is not inputted, the updating of the present time is continuously performed (steps S103 and S104).

As a result of judgement at step S104, if the present time and the reserved recording time coincide with each other, a signal for the reserved recording mode is outputted, while if the power key is inputted, a signal for the normal operation mode is outputted (step S105), so that the operation of the respective mode is performed (step S206).

As shown in FIG. 6, in the normal operation mode, if the power is applied to the second control section 201 of the digital TV, and the present time and the operation mode is determined (step S301, S401~S402), the second control section outputs the corresponding control signal so that the load is operated according to the analysis of the MPEG signal (step S403).

If the output is performed according to the MPEG signal, the first control section detects the key input signal or the RCU input signal, and sends the detected signal to the second control section 201 (step S302). Then, the second control section judges whether the input key signal is the power key signal (step S404).

If the input key signal is not the power key signal as a result of judgement (step S404), the second control section performs the function corresponding to the input key signal (step S405), and receives again the key signal (step S302).

Then, the first control section 201 receives from the second control section the earliest reserved recording information among the user's reserved recording time information stored in the flash memory 204 and the present time, and then turns off the power of the second control section 105 (step S406)

If the power of the second control section 201 is off, the second control section 201 stores in the flash memory 204 the current operation state of the second control section 201 and the power-off state of the second control section 201, and terminates its operation (step S406).

Then, if the operation of the second control section 201 is terminated due to the power-off (step S406), the first control section 105 updates the present time by dividing the system clock based on the inputted present time (step S304). At this time, if the present time of the first control section 105 is updated, the first control section 105 judges whether the power key is inputted and whether the present time coincides with the reserved recording time (step S305).

As a result of judgement at step S305, if the present time and the reserved time information do not coincide with each other or the power key is not inputted, the updating of the present time is continuously performed (steps S304 and S305).

As a result of judgement at step S305, if the present time and the reserved recording time coincide with each other, a signal for the reserved recording mode is outputted, while if the power key is inputted, a signal for the normal operation mode is outputted (step S306), so that the operation of the respective mode is performed (step S407).

As described above, the real-time compensation apparatus and method for a digital TV according to the present invention can reduce the loss of the real-time function such as the user's reserved recording by updating the present time without addition of any separate device even if the power supply is resumed due to the power failure and so on, and thus improve the reliability of the product.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A real-time compensation apparatus for a digital TV having an input section, flash memory, and load, the apparatus comprising:
   a first control section for controlling a power supply of a system, updating time information by dividing a system clock, and outputting a reserved recording signal according to a result of comparing a present time with a user's reserved recording time; and a second control section for transmitting the reserved recording information and the present time information stored in a flash memory to the first control section if the power supply is off, and outputting a load control signal so that output of video and audio signals is performed according to the signal outputted from the first control section according to the user's reserved recording time.

2. A method of controlling a real-time compensation apparatus for a digital TV having a flash memory, first control section, and second control section, the method comprising the steps of: normally operating the second control section by supplying a power to the second control section according to control of the first control section if a main power supply is resumed; and updating the present time information by dividing a system clock if the present mode is converted into the first mode and reservation information according to predetermined first to third modes if the second control section is normally operated.

3. The method as claimed in claim 2, wherein the step the first mode is a power-off mode, the second mode is a reserve recording mode, and the third mode is a normal operation mode.

4. The method as claimed in claim 2, wherein the step of updating time information and reservation information according to the second mode comprises the steps of: judging whether to perform a recording by comparing and analyzing the present time and the predetermined reservation information; updating the present time by dividing a system clock of the first control section based on the present time; and performing the reserved recording mode if the updated present time and the reserved recording time coincide with each other.

5. The method as claimed in claim 4, wherein the step of updating the present time information is performed by parsing a TDT/TOT.

6. The method as claimed in claim 4, wherein the step of updating time information and reservation information according to the third mode comprises the steps of:
   judging whether to perform a recording by comparing and analyzing the present time and the predetermined reservation information;
   updating the present time by dividing a system clock of the first control section based on the present time; and
   performing the reserved recording mode if the updated present time and the reserved recording time coincide with each other.

7. The method as claimed in claim 2, wherein the step of updating time information and reservation information according to the third mode comprises the steps of:
   analyzing an MPEG signal, and outputting a load control signal according to analysis;
   transmitting to the first control section the present time and a portion of the predetermined reservation information if the control signal is outputted and a power key signal is inputted;
   determining the present time and converting the present mode into the first mode if the reservation information is transmitted to the first control section;
   updating the present time by dividing a system clock of the first control section if the present mode is converted into the first mode; and
   performing the reserved recording if the updated present time and the reserved recording time coincide with each other.

8. The method as claimed in claim 7, further comprising the step of performing a function corresponding to the input key signal if the power key signal is not inputted, and receiving again the key signal.

* * * * *